United States Patent
Mukadam et al.

(10) Patent No.: US 10,739,776 B2
(45) Date of Patent: Aug. 11, 2020

(54) AUTONOMOUS VEHICLE POLICY GENERATION

(71) Applicant: Honda Motor Co., Ltd., Tokyo (JP)

(72) Inventors: Mustafa Mukadam, Atlanta, GA (US); Alireza Nakhaei Sarvedani, Sunnyvale, CA (US); Akansel Cosgun, Melbourne (AU); Kikuo Fujimura, Palo Alto, CA (US)

(73) Assignee: Honda Motor Co., Ltd., Tokyo (JP)

( * ) Notice: Subject to any disclaimer, the term of this patent is extended or adjusted under 35 U.S.C. 154(b) by 184 days.

(21) Appl. No.: 16/103,847

(22) Filed: Aug. 14, 2018

(65) Prior Publication Data

US 2019/0113929 A1  Apr. 18, 2019

Related U.S. Application Data

(60) Provisional application No. 62/571,717, filed on Oct. 12, 2017.

(51) Int. Cl.
*G05D 1/02* (2020.01)
*G05D 1/00* (2006.01)
(Continued)

(52) U.S. Cl.
CPC ......... *G05D 1/0221* (2013.01); *B60W 30/085* (2013.01); *G05D 1/0088* (2013.01); *G08G 1/167* (2013.01); *G05D 2201/0213* (2013.01)

(58) Field of Classification Search
CPC ............... G05D 1/0088; G05D 1/0221; G05D 2201/0213; B60W 10/04; B60W 10/18;
(Continued)

(56) References Cited

U.S. PATENT DOCUMENTS 9,632,502 B1 * 4/2017 Levinson ............. G05D 1/0027
2016/0257305 A1 * 9/2016 Riviere-Cazaux .... B60W 50/14
(Continued)

OTHER PUBLICATIONS

Austerweil, J. L., Brawner, S., Greenwald, A., Hilliard, E., Ho, M., Littman, M. L, MacGlashan, J., and Trimbach, C. (2016). How other-regarding preferences can promote cooperation in non-zero-sum grid games. In Proceedings of the AAAI Symposium on Challenges and Opportunities in Multiagent Learning for the Real World.

(Continued)

*Primary Examiner* — Babar Sarwar
(74) *Attorney, Agent, or Firm* — Rankin, Hill & Clark LLP

(57) ABSTRACT

According to one aspect, an autonomous vehicle policy generation system may include a state input generator generating a set of attributes associated with an autonomous vehicle undergoing training, a traffic simulator simulating a simulation environment including the autonomous vehicle, a roadway associated with a number of lanes, and another vehicle within the simulation environment, a Q-masker determining a mask to be applied to a subset of a set of possible actions for the autonomous vehicle for a time interval, and an action generator exploring a remaining set of actions from the set of possible actions and determining an autonomous vehicle policy for the time interval based on the remaining set of actions and the set of attributes associated with the autonomous vehicle.

20 Claims, 7 Drawing Sheets

(51) Int. Cl.
  G08G 1/16 (2006.01)
  B60W 30/085 (2012.01)
(58) Field of Classification Search
  CPC ......... B60W 10/20; B60W 2050/0014; B60W 2600/00; B60W 2710/18; B60W 2710/20; B60W 2720/106; B60W 30/085; B60W 30/18109; B60W 30/18163; B60W 50/00; G06N 3/08; G08G 1/167
  See application file for complete search history.

(56) References Cited

U.S. PATENT DOCUMENTS

| | | | |
|---|---|---|---|
| 2017/0031361 A1* | 2/2017 | Olson | B60W 50/0097 |
| 2018/0060701 A1* | 3/2018 | Krishnamurthy | G06N 3/04 |
| 2018/0121768 A1* | 5/2018 | Lin | G06K 9/66 |
| 2019/0228571 A1* | 7/2019 | Atsmon | G01C 11/04 |
| 2019/0243372 A1* | 8/2019 | Huval | B60W 30/0953 |
| 2019/0291727 A1* | 9/2019 | Shalev-Shwartz | B60W 10/18 |

OTHER PUBLICATIONS

C. R. Baker and J. M. Dolan, "Traffic interaction in the urban challenge: Putting boss on its best behavior," in 2008 IEEE/RSJ International Conference on Intelligent Robots and Systems (IROS), pp. 1752-1758.
Bansal, T., Pachocki, J., Sidor, S., Sutskever, I., and Mordatch, I. (2017). Emergent complexity via multi-agent competition. arXiv preprint arXiv:1710.03748.
Bengio, Y., Louradour, J., Collobert, R., and Weston, J. (2009). Curriculum learning. In Proceedings of the 26th annual International conference on machine learning, pp. 41-48. ACM.
Sao, Y., Yu, W., Ren, W., and Chen, G. (2013). An overview of recent progress in the study of distributed multi-agent coordination. IEEE Transactions on Industrial informatics, 9(1), 427-438.
Chang, Y.-H., Ho, T., and Kaelbling, L. P. (2004). All learning is local: Multi-agent learning in global reward games. In Advances in neural information processing systems, pp. 807-814.
Foerster, J., Farquhar, G., Afouras, T., Nardelli, N., and Whiteson, S. (2017). Counterfactual multi-agent policy gradients. arXiv preprint arXiv:1705.08926.
Gupta, J. K., Egorov, M., and Kochenderfer, M. (2017). Cooperative multi-agent control using deep reinforcement learning. In International Conference on Autonomous Agents and Multiagent Systems, pp. 66-83. Springer.
Hu, J. and Wellman, M. P. (2003). Nash q-learning for general-sum stochastic games. Journal of machine learning research, 4(Nov), 1039-1069.
C. Hubmann, M. Becker, D. Althoff, D. Lenz, and C. Stiller, "Decision making for autonomous driving considering Interaction and uncertain prediction of surrounding vehicles," in 2017 IEEE Intelligent Vehicles Symposium (IV), pp. 1671-1678.
Isele, D., Cosgun, A., Subramanian, K., and Fujimura, K. (2017). Navigating intersections with autonomous vehicles using deep reinforcement learning. arXiv preprint arXiv:1705.01196.
Konda, V. R. and Tsitsiklis, J. N. (2000). Actor-critic algorithms. In Advances in neural information processing systems, pp. 1008-1014.
Kuefler, A., Morton, J., Wheeler, T., and Kochenderfer, M. (2017). Imitating driver behavior with generative adversarial networks. arXiv preprint arXiv:1701.06699.
Leibo, J. Z., Zambaldi, V., Lanctot, M., Marecki, J., and Graepel, T. (2017). Multi-agent reinforcement learning in sequential social dilemmas. In Proceedings of the 16th Conference on Autonomous Agents and MultiAgent Systems, pp. 464-473. International Foundation for Autonomous Agents and Multiagent Systems.
Lillicrap, T. P., Hunt, J. J., Pritzel, A., Heess, N., Erez, T., Tassa, Y., Silver, D., and Wierstra, D. (2015). Continuous control with deep reinforcement learning. arXiv preprint arXiv:1509.02971.
Littman, M. L. (1994). Markov games as a framework for multi-agent reinforcement learning. In Machine Learning Proceedings 1994, pp. 157-163. Elsevier.
Lowe, R. Wu, Y. Tamar, A. Harb J. Abbeel, O. P., and Mordatch, L (2017). Multi-agent actor-critic for mixed cooperative-competitive environments. In Advances in Neural Information Processing Systems, pp. 6382-6393.
Marler, R. T. and Arora, J. S. (2004). Survey of multi-objective optimization methods for engineering. Structural and multidisciplinary optimization, 26(6), 369-395.
I. Miller et al., "Team Cornell's Skynet: Robust perception and planning in an urban environment," J. Field Robot., vol. 25, No. 8, pp. 493-527, 2008.
M. Montemerlo et al., "Junior: The Stanford entry in the urban challenge," J. Field Robot., vol. 25, No. 9, pp. 569-597, 2008.
Mordatch, I. and Abbeel, P. (2017). Emergence of grounded compositional language in multi- agent populations. arXiv preprint arXiv:1703.04908.
M. Mukadam, A. Cosgun, A. Nakhaei, and K Fujimura, "Tactical Decision Making for Lane Changing with Deep Reinforcement Learning," in 31th Conference on Neural Information Processing Systems (NIPS), 2017.
J. Nilsson and J. Sjoberg, "Strategic decision making for automated driving on two-lane, one way roads using model predictive control," in IEEE Intelligent Vehicles Symposium, 2013, pp. 1253-1258.
Oliehoek, F. A., Spaan, M. T., and Vlassis, N. (2008). Optimal and approximate q-value functions for decentralized pomdps. Journal of Artificial Intelligence Research, 32, 289-353.
Pan, S. J. and Yang, Q. (2010). A survey on transfer learning. IEEE Transactions on knowledge and data engineering, 22(10), 1345-1359.
Panait, L. and Luke, S. (2005). Cooperative multi-agent learning: The state of the art. Au-tonomous agents and multi-agent systems, 11(3), 387-434.
Rusu, A. A., Rabinowitz, N. C., Desjardins, G., Soyer, H., Kirkpatrick, J., Kavukcuoglu, K., Pas-canu, R., and Hadsell, R. (2016). Progressive neural networks. arXiv preprint arXiv:1606.04671.
D. Sadigh, S. Sastry, S. A. Seshia, and a. D. Dragan, "Planning for autonomous cars that leverage effects on human actions", in Robotics: Science and Systems, 2016.
Schaul, T., Horgan, D., Gregor, K., and Silver, D. (2015). Universal value function approximators. In International Conference on Machine Learning, pp. 1312-1320.
N. Schwarting, J. Alonso-Mora, and D. Rus, "Planning and decision making for autonomous vehicles," in Annual Review of Control, Robotics, and Autonomous Systems, 2018.
S. Shalev-Shwartz, S. Shammah, A. Shashua, "On a formal model of safe and scalable self-driving cars," arXiv:1708.06374, 2017.
Silver, D., Schrittwieser, J., Simonyan, K., Antonoglou, I., Huang, A., Guez, A., Hubert, T., Baker, L., Lai, M., Bolton, A., et al. (2017). Mastering the game of go without human knowledge. Nature, 550(7676), 354.
Sutton, R. S. and Barto, A. G. (1998). Reinforcement learning: An introduction, vol. 1. MIT press Cambridge.
Sutton, R. S., McAllester, D. A., Singh, S. P., and Mansour, Y. (2000). Policy gradient methods for reinforcement learning with function approximation. In Advances in neural information processing systems, pp. 1057-1063.
Tampuu, A., Matiisen, T., Kodelja, D., Kuzovkin, I., Korjus, K., Aru, J., Aru, J., and Vicente, R. (2017). Multiagent cooperation and competition with deep reinforcement learning. PloS one, 12(4), e0172395.
Tan, M. (1993). Multi-agent reinforcement learning: Independent vs. cooperative agents. In Proceedings of the tenth international conference on machine learning, pp. 330-337.
Thrun, S. B. (1992). Efficient exploration in reinforcement learning.
Van Lange, P. A., Joireman, J., Parks, C. D., and Van Dijk, E. (2013). The psychology of social dilemmas: A review. Organizational Behavior and Human Decision Processes, 120(2), 125-141.
R. J. Williams, "Simple statistical gradient-following algorithms for connectionist reinforcement learning," in Machine learning, 1992.
P. Wolf, K. Kurzer, T. Wingert, F. Kuhnt, and J. M. Zollner, "Adaptive Behavior Generation for Autonomous Driving using

(56) References Cited

OTHER PUBLICATIONS

Deep Reinforcement Learning with Compact Semantic States." in 2018 IEEE Intelligent Vehicle Symposium (IV), pp. 993-1000.

J. Yang, A. Nakhaei, D. Isele, H. Zha, and K. Fujimura, "CM3: Cooperative Multi-goal Multi-stage Multi-agent Reinforcement Learning," arXiv preprint, 2018.

Zhang K. Yang, Z., Liu, H., Zhang, T., and Basar, T. (2018). Fully decentralized multi-agent reinforcement learning with networked agents. arXiv preprint arXiv:1802.08757.

M. Bojarski, D. Del Testa, D. Dworakowski, B. Fimer, B. Flepp, P. Goyal, L D. Jackel, M. Monfort, U. Muller, J. Zhang, et al., "End to end learning for self-driving cars," arXiv preprint arXiv:1604.07316, 2016.

C. Chen, A. Seff, A. Kornhauser, and J. Xiao, "Deepdriving: Learning affordance for direct perception in autonomous driving," in Proceedings of the IEEE International Conference on Computer Vision, pp. 2722-2730, 2015.

A. Cosgun, L. Ma, J. Chiu, J. Huang, M. Demir, A. M. Anon, T. Lian, H. Tafish, and S. Al-Stouhi, "Towards full automated drive in urban environments: a demonstration in gomentum station, california," in IEEE Intelligent Vehicles Symposium, IV 2017, Los Angeles, CA, USA, Jun. 11-14, 2017, pp. 1811-1818, 2017.

Y. Du, Y. Wang, and C.-Y. Chan, "Autonomous lane-change controller via mixed logical dynamical," in Intelligent Transportation Systems (ITSC), 2014 IEEE 17th International Conference on, pp. 1154-1159, IEEE, 2014.

P. Falcone, F. Borrelli, J. Asgari, H. E. Tseng, and D. Hrovat, "Predictive active steering control for autonomous vehicle systems," IEEE Transactions on control systems technology, vol. 15, No. 3, pp. 566-580, 2007.

C. Hatipoglu, U. Ozguner, and K. A. Redmill, "Automated lane change controller design," IEEE transac-tions on intelligent transportation systems, vol. 4, No. 1, pp. 13-22, 2003.

H. Jula, E B. Kosmatopoulos, and P. A. loannou, "Collision avoidance analysis for lane changing and merging," IEEE Transactions on vehicular technology, vol. 49, No. 6, pp. 2295-2308, 2000.

J. Koutnik, G. Cuccu, J. Schmidhuber, and F. Gomez, "Evolving large-scale neural networks for vision-based torcs," 2013.

D. Krajewicz, J. Erdmann, M. Behrisch, and L. Bieker, "Recent development and applications of sumo-simulation of urban mobility," International Journal on Advances in Systems and Measurements, vol. 5, No. 38,4, pp. 128-138, 2012.

S. Krauß, P. Wagner, and C. Gawron, "Metastable states in a microscopic model of traffic flow," Physical Review E, iol. 55, No. 5, p. 5597, 1997.

V. Mnih, K. Kavukcuoglu, D. Silver, A. A. Rusu, J. Veness, M. G. Bellemare, A. Graves, M. Riedmiller, A. K. Fidjeland, G. Ostrovski, et al., "Human-level control through deep reinforcement learning," Nature, vol. 518, No. 1540, pp. 529-533, 2015.

U. Muller, J. Ben, E. Cosatto, B. Flepp, and Y. L. Cun, "Off-road obstacle avoidance through end-to-end learning," in Advances in neural information processing systems, pp. 739-746, 2006.

J. E. Naranjo, C. Gonzalez, R. Garcia, and T. De Pedro, "Lane-change fuzzy control in autonomous vehicles for the overtaking maneuver," IEEE Transactions on Intelligent Transportation Systems, vol. 9, No. 3, pp. 438-450, 2008.

P. Petrov and F. Nashashibi, "Adaptive steering control for autonomous lane change maneuver," in Intelligent Vehicles Symposium (IV), 2013 IEEE, pp. 835-840, IEEE, 2013.

S. Sharifzadeh, I. Chiotellis, R. Triebel, and D. Cremers, "Learning to drive using inverse reinforcement learning and deep q-networks," arXiv preprint arXiv:1612.03653, 2016.

S. Shalev-Shwartz, S. Shammah, and A. Shashua, "Safe, multi-agent, reinforcement learning for au-tonomous driving," arXiv preprint arXiv:1610.03295, 2016.

Z. Shiller and S. Sundar, "Emergency lane-change maneuvers of autonomous vehicles," Journal of Dynamic Systems, Measurement, and Control, vol. 120, No. 1, pp. 37-44, 1998.

C. J. Taylor, J. Košecká, R. Blasi, and J. Malik, "A comparative study of vision-based lateral control strategies for autonomous highway driving," The International Journal of Robotics Research, vol. 18, No. 5, pp. 442-453, 1999.

H. Tehrani, Q. H. Do, M. Egawa, K. Muto, K. Yoneda, and S. Mita, "General behavior and motion model for automated lane change," in Intelligent Vehicles Symposium (IV), 2015 IEEE, pp. 1154-1159, IEEE, 2015.

C. Urmson, J. Anhalt, D. Bagnell, C. Baker, R. Bittner, M. Clark, J. Dolan, D. Duggins, T. Galatali, C. Geyer, et al., "Autonomous driving in urban environments: Boss and the urban challenge," Journal of Field Robotics, vol. 25, No. 8, pp. 425-466, 2008.

R. van der Horst and J. Hogema, Time-to-collision and collision avoidance systems. na, 1993.

H. Xu, Y. Y Gao, F. F Yu, and T. Darrell, "End-to-end learning of driving models from large-scale video datasets," arXiv . preprint arXiv:1612.01079, 2016.

F. You, R. Zhang, G. Lie, H. Wang, H. Wen, and J. Xu, "Trajectory planning and tracking control for autonomous lane change maneuver based on the cooperative vehicle infrastructure system," Expert Systems with Applications, vol. 42, No. 14, pp. 5932-5946, 2015.

J. Ziegler, R Bender, T. Dang, and C. Stiller, "Trajectory planning for bertha—a local, continuous method," in Intelligent Vehicles Symposium Proceedings, 2014 IEEE, pp. 450-457, IEEE, 2014.

\* cited by examiner

AUTONOMOUS VEHICLE POLICY GENERATION

CROSS-REFERENCE TO RELATED APPLICATIONS

This application claims the benefit of U.S. Provisional Patent Application, Ser. No. 62/571717 entitled "TACTICAL DECISION MAKING FOR LANE CHANGING WITH DEEP REINFORCEMENT LEARNING", filed on Oct. 12, 2017; the entirety of the above-noted application(s) is incorporated by reference herein.

BACKGROUND

In recent years, there has been a growing interest in self-driving cars. However, autonomous driving vehicles face many decisions, such as when to lane change, how to lane change, etc. These decisions are often made in a multi-lane or multi-agent setting or environments. In any event, a self-driving vehicle may be called upon to perform an efficient lane change maneuver in a safe manner. This may be useful in a multi-lane highway setting or environment, such as in the presence of fast moving traffic. Determining or generating these driving maneuvers or lane change decisions may be challenging and complex due to interactions between the autonomous vehicle and other vehicles, along with many other factors, such as weather or road conditions, for example.

BRIEF DESCRIPTION

According to one aspect, an autonomous vehicle policy generation system may include a state input generator, a traffic simulator, a Q-masker, and an action generator. The state input generator may generate a set of attributes associated with an autonomous vehicle undergoing training. The traffic simulator may simulate a simulation environment including the autonomous vehicle, a roadway associated with a number of lanes, and another vehicle within the simulation environment. The Q-masker may determine a mask to be applied to a subset of a set of possible actions for the autonomous vehicle for a time interval. The action generator may explore a remaining set of actions from the set of possible actions and determine an autonomous vehicle policy for the time interval based on the remaining set of actions and the set of attributes associated with the autonomous vehicle. The remaining set of actions excludes the masked subset of actions.

The set of attributes may include a current velocity associated with the autonomous vehicle, a lane position associated with the autonomous vehicle, and a distance from the autonomous vehicle to a goal. The goal may be a desired destination. The set of possible actions for the autonomous vehicle may include an autonomous driving maneuver of, during the time interval, maintaining the current velocity associated with the autonomous vehicle, accelerating, decelerating, performing a right lane change, or performing a left lane change.

The Q-masker may determine the mask to be applied to the subset of actions based on prior knowledge indicative of predefined permissible interactions between the autonomous vehicle and the simulation environment or between the autonomous vehicle and the other vehicle within the simulation environment, a traffic rule indicative of permissible driving maneuvers, or a capability associated with the autonomous vehicle indicative of physically possible driving maneuvers associated with the autonomous vehicle.

The Q-masker may determine, based on the prior knowledge, the masked subset of actions to include an autonomous driving maneuver of performing a right lane change when the autonomous vehicle is positioned on a right-most lane of the roadway and an autonomous driving maneuver of performing a left lane change when the autonomous vehicle is positioned on a left-most lane of the roadway. The Q-masker may determine, based on the prior knowledge, the masked subset of actions to include an autonomous driving maneuver of accelerating when the autonomous vehicle is positioned a first threshold distance behind the other vehicle when both the autonomous vehicle and the other vehicle are positioned in the same lane and an autonomous driving maneuver of decelerating when the autonomous vehicle is positioned a second threshold distance ahead of the other vehicle when both the autonomous vehicle and the other vehicle are positioned in the same lane.

The Q-masker may determine, based on the prior knowledge, the masked subset of actions to include an autonomous driving maneuver of a left lane change when the autonomous vehicle is positioned to the right and within a lane change threshold distance of the other vehicle and an autonomous driving maneuver of a right lane change when the autonomous vehicle is positioned to the left and within a lane change threshold distance of the other vehicle. The Q-masker may determine, based on the prior knowledge, the masked subset of actions to include any driving maneuver associated with an anticipated decrease with a time to collision (TTC) estimate between the autonomous vehicle and the other vehicle when the TTC estimate is below a threshold TTC value.

The Q-masker may determine, based on the traffic rule, the masked subset of actions to include accelerating when a current velocity associated with the autonomous vehicle is greater than a speed limit associated with the roadway and decelerating when the current velocity associated with the autonomous vehicle is less than a minimum speed limit associated with the roadway. The Q-masker may determine, based on the traffic rule, the masked subset of actions to include an autonomous driving maneuver of performing a right lane change when the autonomous vehicle is positioned directly right of double lane markings of the roadway and an autonomous driving maneuver of performing a left lane change when the autonomous vehicle is positioned directly left of double lane markings of the roadway.

The action generator may explore the remaining set of actions from the set of possible actions and determine the autonomous vehicle policy for one or more additional time intervals until the autonomous vehicle reaches a terminal state. The action generator may store one or more explored set of actions associated with the one or more additional time intervals as one or more corresponding trajectories. The action generator may explore the remaining set of actions from the set of possible actions based on a reward function and determine the autonomous vehicle policy based on the reward function. The reward function may include a discount factor.

According to one aspect, an autonomous vehicle policy generation method may include generating a set of attributes associated with an autonomous vehicle undergoing training, simulating a simulation environment including the autonomous vehicle, a roadway associated with a number of lanes, and another vehicle within the simulation environment, determining a mask to be applied to a subset of a set of possible actions for the autonomous vehicle for a time interval, exploring a remaining set of actions from the set of possible actions, and determining an autonomous vehicle policy for the time interval based on the remaining set of actions and the set of attributes associated with the autonomous vehicle. The remaining set of actions excludes the masked subset of actions.

The set of attributes may include a current velocity associated with the autonomous vehicle, a lane position associated with the autonomous vehicle, and a distance from the autonomous vehicle to a goal. The goal may be a desired destination. The set of possible actions for the autonomous vehicle may include an autonomous driving maneuver of, during the time interval, maintaining the current velocity associated with the autonomous vehicle, accelerating, decelerating, performing a right lane change, or performing a left lane change.

Determining the mask to be applied to the subset of actions may be based on prior knowledge indicative of predefined permissible interactions between the autonomous vehicle and the simulation environment or between the autonomous vehicle and the other vehicle within the simulation environment, a traffic rule indicative of permissible driving maneuvers, or a capability associated with the autonomous vehicle indicative of physically possible driving maneuvers associated with the autonomous vehicle. The method may include implementing the autonomous vehicle policy for an autonomous vehicle outside the simulation environment.

According to one aspect, an autonomous vehicle policy generation system may include a state input generator, a traffic simulator, a Q-masker, and an action generator. The state input generator may generate a set of attributes associated with an autonomous vehicle undergoing training. The traffic simulator may simulate a simulation environment including the autonomous vehicle, a roadway associated with a number of lanes, and another vehicle within the simulation environment. The Q-masker may determine a mask to be applied to a subset of a set of possible actions for the autonomous vehicle for a time interval based on prior knowledge indicative of predefined permissible interactions between the autonomous vehicle and the simulation environment or between the autonomous vehicle and the other vehicle within the simulation environment, a traffic rule indicative of permissible driving maneuvers, or a capability associated with the autonomous vehicle indicative of physically possible driving maneuvers associated with the autonomous vehicle. The action generator may explore a remaining set of actions from the set of possible actions and determine an autonomous vehicle policy for the time interval based on the remaining set of actions and the set of attributes associated with the autonomous vehicle. The remaining set of actions excludes the masked subset of actions.

DETAILED DESCRIPTION

The following terms are used throughout the disclosure, the definitions of which are provided herein to assist in understanding one or more aspects of the disclosure.

An agent may take actions (which may be simulated actions) from a set of possible actions. The set of possible actions may be known as the action set (A).

An environment may be a simulation environment or the world through which the agent moves.

A reward function (R) may be a function that evaluates a taken, (e.g., simulated) action.

A discount factor ($\gamma$) may be multiplied with future rewards to make short-term decisions weigh more than long-term rewards.

A value (V) may be an expected long-term return which includes the effect of the discount factor.

A Q-value (Q) may be an action value which is indicative of the long-term return of an action (a) under policy ($\pi$) on state (s).

A trajectory may be a sequence of states and/or actions which include those states.

A policy ($\pi$) may be a strategy employed to determine the next action for the agent based on the current state.

Figure 1:
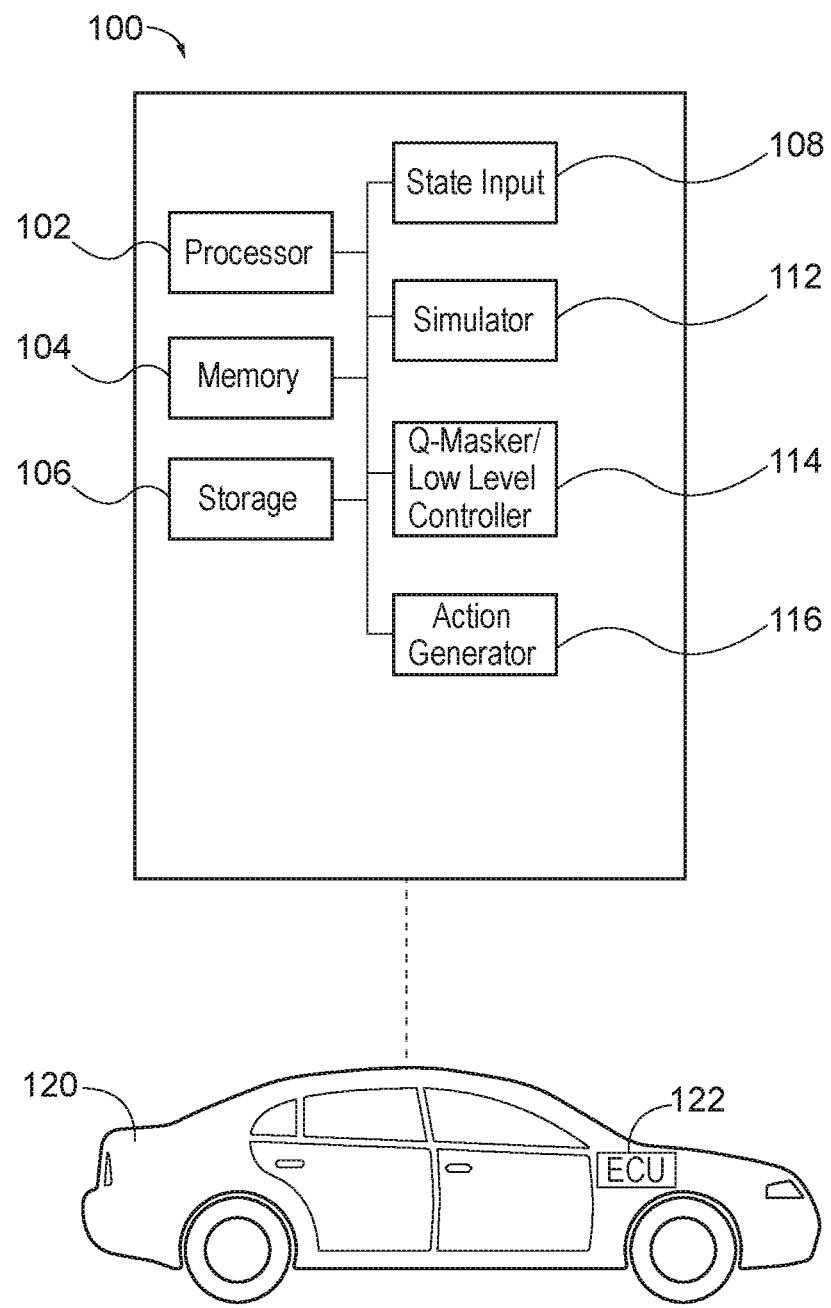
FIG. 1 is a component diagram of an autonomous vehicle policy generation system, according to one or more aspects.

FIG. 1 is a component diagram of an autonomous vehicle policy generation system 100, according to one or more aspects. The autonomous vehicle policy generation system 100 may include a processor 102, a memory 104, a storage drive 106, a state input generator 108, a traffic simulator 112, a Q-masker 114, and an action generator 116. The state input generator 108, traffic simulator 112, Q-masker 114, and action generator 116 may be implemented via the processor 102, the memory 104, and/or the storage drive 106.

The autonomous vehicle policy generation system 100 may generate, through simulation and through Q-masking, an autonomous vehicle policy for an autonomous vehicle 120, which may implement the autonomous vehicle policy using an electronic control unit (ECU) 122, for example.

The state input generator 108 determines or generates state information associated with the autonomous vehicle, as simulated. In other words, the state input generator 108 is responsible for determining inputs for a network associated with autonomous vehicle policy generation. Examples of these inputs may include the state of the simulated autonomous vehicle, including state information internal to the simulated autonomous vehicle (e.g., a velocity or a current velocity associated with the simulated autonomous vehicle) and state information external to the simulated autonomous vehicle (e.g., a lane location or a lane position associated with the simulated autonomous vehicle, and a distance from a goal, such as a desired destination). The goal may not necessarily be a final destination, but may be a waypoint destination along a route, for example. The traffic simulator 112 may simulate a simulation environment which includes the simulated autonomous vehicle and one or more other vehicles (e.g., a first vehicle, a second vehicle, a third vehicle, etc.) within the simulation environment. The traffic simulator 112 may be configured to control the other vehicles to maintain a velocity within a range.

Because the distance to the goal is considered as an input to the simulator, reasoning about long term decisions on a strategic level may be considered when present in a driving scenario, such as a multi-lane highway among traffic.

According to one aspect, the traffic simulator 112 may control the other vehicles within the simulation environment to avoid collisions with one another, but not with the simulated autonomous vehicle (e.g., the agent). The Q-masker 114 may be implemented via a low-level controller and be part of a deep Q-learning system which learns policies which enable the autonomous vehicle to make decisions on a tactical level. The deep Q-learning system may learn a mapping between states and Q-values associated with each potential action. Stated another way, the traffic simulator 112, using the deep Q-learning system and without application of the Q-masker 114, would proceed to simulate all possible actions for each time frame, which may utilize a great deal of computing power. Therefore, learning a full policy, where each and every action is explored may be difficult with large networks to train.

In a Q-learning network, a mapping between states and Q-values associated to each action may be learned. According to one aspect, Q-masking, in the form of a mask that is applied on the output Q-values before a max (or soft max) operator may be applied on the output layer of Q-values to pick the 'best' action. In this regard, direct effect of the 0-masker 114 is that when taking the max operation to choose the 'best' action, only the Q-values associated with a subset of actions, which are dictated by a lower-level module, are considered.

Thus, the Q-masker 114 may mask a subset of output Q-values which are to be simulated by the traffic simulator 112. Therefore, only the Q-values associated with a remaining subset of actions are considered by the traffic simulator 112 during simulation, thereby mitigating the amount of processing power and/or computing resources utilized during simulation and training of the autonomous vehicle in autonomous vehicle policy generation. Based on the remaining subset of actions (e.g., of a set of possible actions, the subset of actions excluding the masked subset), the action generator 116 may explore the remaining actions and determine the autonomous vehicle policy accordingly. This may be repeated across one or more time intervals. The Q-masker 114 may thereby 'force' the simulated autonomous vehicle to explore only the non-masked states, and thus, only learn a subset of the space of associated Q-values (which is indicative of the long-term return of an action (a) under policy ($\pi$) on state (s)).

In greater detail, the state input generator 108 may generate a set of attributes associated with an autonomous vehicle undergoing training (e.g., the simulated autonomous vehicle). For example, the set of attributes may include the current velocity v associated with the autonomous vehicle, a lane position/associated with the autonomous vehicle, and a distance d2g from the autonomous vehicle to a goal, which may be a desired destination. Additionally, the set of attributes or the position information associated with the vehicle may be represented as an occupancy grid. The set of attributes may be state information which is indicative or representative of a state (S) or scenario associated with the autonomous vehicle. For example, information such as a posted speed limit or minimum and maximum speed limits of $v_{min}$ and $v_{max}$ may be determined based on the position or location of the autonomous vehicle.

The traffic simulator 112 may simulate a simulation environment including the autonomous vehicle, a roadway associated with a number of lanes, and one or more other vehicles within the simulation environment. The traffic simulator 112 may generate traffic at a traffic density, and each lane may be assigned a probability $P_{lane}$ of emitting a vehicle at a start position at a time interval, where the other vehicle may be associated with a random start velocity, a random target speed, and a range within which to stay within from the random target speed. The traffic simulator 112 may use models which control the other vehicles to avoid collisions with each other, but not the simulated autonomous vehicle. According to one aspect, the traffic simulator 112 does not control the simulated autonomous vehicle, but merely controls the other vehicles within the simulation environment to only avoid collisions with each other (and not the simulated autonomous vehicle).

The traffic simulator 112 may be a deep Q-learning system, which implements reinforcement learning based on the state input generated attributes for the simulated autonomous vehicle and the simulation environment provided by the traffic simulator 112. Within the simulation environment managed by the traffic simulator 112, the simulated autonomous vehicle may be an agent, which may take simulated actions from the set of possible actions. The set of possible actions may be known as the action set (A). For example, the set of possible actions for the autonomous vehicle includes an autonomous driving maneuver of, during a time interval, maintaining the current velocity associated with the autonomous vehicle, accelerating, decelerating, performing a right lane change, or performing a left lane change.

The simulation environment may be the world or the environment through which the simulated autonomous vehicle moves. The traffic simulator 112 simulates the simulated environment and uses the simulated autonomous vehicle's current state and action (e.g., for a given time interval) as an input, and returns the simulated autonomous vehicle's reward, described below, and next state as an output. For example, the traffic simulator 112 may take the vehicle's current state (e.g., 50 mph) and action (e.g., deceleration), and apply the laws of physics to determine the simulated autonomous vehicle's next state (e.g., 45 mph).

The traffic simulator 112 may utilize a reward function (R) which may be a function that evaluates a taken (e.g., simulated) action. Stated another way, the reward function may be utilized to measure success or failure. For example, if the simulated autonomous vehicle misses a goal (e.g., desired destination) or becomes involved in a collision, the reward function may penalize the simulated action that led to the current state (e.g., the missed goal or the collision). Conversely, the reward function may award rewards based on the fastest time or fastest route to the goal. Rewards may be provided immediately or may be delayed, based on the reward function. The rewards provided by the reward function enables reinforcement learning to occur based on a given goal (e.g., reach an exit ramp).

A discount factor ($\gamma$) may be multiplied with future rewards to make short-term decisions weigh more than long-term rewards. Stated another way, the discount factor may be used to make future rewards worth less than immediate rewards. In this regard, a value (V) may be an expected long-term return which includes the effect of the discount. A Q-value (Q) may be an action value, which is indicative of the long-term return of an action (a) under policy ($\pi$) on state (s). A trajectory may be a sequence of states and/or actions which include those states. A policy ($\pi$) or autonomous vehicle policy may be a strategy by which the action generator 116 uses or employs to determine the next action for the autonomous vehicle based on the current state (e.g., as indicated by the set of attributes associated with the autonomous vehicle).

According to one aspect, the reward function may be:

$$r_T = \begin{cases} +10 & l = 0; \text{exit reached} \\ -10 \times l & l \neq 0; \text{exit missed} \end{cases},$$

where l is the lane in which the simulated autonomous vehicle is located at a target distance D from a start position.

Thus, according to this reward function, a positive terminal reward is given for success (e.g., reaching the goal) and an increasingly negative terminal reward the further the simulated autonomous vehicle ends up away from the lane associated with the goal. The discount factor may encourage the simulated autonomous vehicle to reach the goal in the shortest amount of time or smallest number of time intervals (i.e., maintaining a higher average speed). Further, since collisions are never allowed during training, the reward function does not need to account for collisions, thereby simplifying the reward function.

For example, given a state, the Q-masker 114 may restrict or otherwise "mask off" any set of actions that the agent or simulated autonomous vehicle does not need to explore or learn from their outcomes. In other words, if the simulated autonomous vehicle is positioned in the left most lane, then taking a left lane change action would result in getting off the highway. Therefore, the Q-masker 114 may put a mask on the Q-value associated with the left action such that the left lane change action is never selected in such a state. This enables prior knowledge about the system (i.e., highway shoulders in this example) to be incorporated directly in to the learning process. In turn, a negative reward for getting off the highway does not need to be setup, thereby simplifying the reward function.

Also, since the action generator 116 does not explore these states, the learning itself becomes faster and more efficient. What the action generator 116 ends up learning is a subset of the actual space of Q-values, rather than the entire set. Constraints on the system may also be incorporated in a similar manner. For example, if the autonomous vehicle is driving at the maximum speed $v_{max}$, the accelerate action may be masked (or if at the minimum speed $v_{min}$, then decelerate action is masked). In this way, the action generator 116 is not required to spend time learning the speed limits of the highway or roadway.

The Q-masker 114 may determine a mask to be applied to a subset of the set of possible actions for the autonomous vehicle for a time interval. These masks sets of actions will not be explored or considered by the action generator 116, thereby mitigating the amount of computational resources (e.g., processing power, memory, storage, etc.) utilized by a system for autonomous vehicle policy generation.

According to one aspect, the Q-masker 114 may determine the mask to be applied based on prior knowledge, one or more traffic rules, constraints or information from the low-level controller, or a capability associated with the autonomous vehicle. The prior knowledge may be indicative of predefined permissible interactions between the autonomous vehicle and the simulation environment or between the autonomous vehicle and other vehicles within the simulation environment. Stated another way, the Q-masker 114 may utilize prior knowledge to mask actions which may result in collisions between the simulated autonomous vehicle and other vehicles, increase a time to collision (TTC), cause the simulated autonomous vehicle to deviate from the roadway, or fall outside of a desired operating threshold or range, for example.

The traffic rule may be indicative of permissible driving maneuvers based on the location or current position of the vehicle. For example, the traffic rule may include a maximum speed limit, a minimum speed limit, driving etiquette, such as not swerving, performing double lane changes without a pause in between, not performing driving maneuvers which would 'cut off' another driver, etc. Stated another way, the Q-masker 114 may determine, based on the traffic rule, the masked subset of actions to include accelerating when the current velocity associated with the autonomous vehicle is greater than a speed limit associated with the roadway and decelerating when the current velocity associated with the autonomous vehicle is less than a minimum speed limit associated with the roadway. In this way, accelerating and decelerating actions which would break minimum and maximum speed limits of $v_{min}$ and $v_{max}$ would be masked by the Q-masker 114.

Other traffic rules may include not passing on a double lane marking. For example, the Q-masker 114 may determine, based on the traffic rule, the masked subset of actions to include an autonomous driving maneuver of performing a right lane change when the autonomous vehicle is positioned directly right of double lane markings of the roadway and an autonomous driving maneuver of performing a left lane change when the autonomous vehicle is positioned directly left of double lane markings of the roadway.

Additionally, the capability associated with the autonomous vehicle may be indicative of physically possible driving maneuvers associated with the autonomous vehicle. For example, if the autonomous vehicle is already travelling at top speed, accelerating may not be possible, and thus, the acceleration action may be masked by the Q-masker 114.

Other examples of actions which may be masked by the Q-masker 114 include lane changes which would result in the autonomous vehicle travelling off of the roadway. Stated another way, the Q-masker 114 may determine, based on the prior knowledge, the masked subset of actions to include an autonomous driving maneuver of performing a right lane change when the autonomous vehicle is positioned on a right-most lane of the roadway and an autonomous driving maneuver of performing a left lane change when the autonomous vehicle is positioned on a left-most lane of the roadway.

Similarly, the Q-masker 114 may mask actions which are associated with accelerating or decelerating into another vehicle. For example, the Q-masker 114 may determine, based on the prior knowledge, the masked subset of actions to include an autonomous driving maneuver of accelerating when the autonomous vehicle is positioned a first threshold distance behind the other vehicle when both the autonomous vehicle and the other vehicle are positioned in the same lane and an autonomous driving maneuver of decelerating when the autonomous vehicle is positioned a second threshold distance ahead of the other vehicle when both the autonomous vehicle and the other vehicle are positioned in the same lane.

According to another aspect, the Q-masker 114 may mask actions of the simulated autonomous vehicle based on other thresholds (e.g., no lane changes based on a lane change threshold distance or no actions associated with decreasing a time to collision (TTC) estimate in some scenarios). For example, the Q-masker 114 may determine, based on the prior knowledge, the masked subset of actions to include an autonomous driving maneuver of a left lane change when the autonomous vehicle is positioned to the right and within a lane change threshold distance of the other vehicle and an autonomous driving maneuver of a right lane change when the autonomous vehicle is positioned to the left and within the lane change threshold distance of the other vehicle. The Q-masker 114 may determine, based on the prior knowledge, the masked subset of actions to include any driving maneuver associated with an anticipated decrease with a TTC estimate between the autonomous vehicle and the other vehicle when the TTC estimate is below a threshold TTC value.

In this way, the Q-masker 114 provides many benefits and/or advantages. For example, using Q-masking, the reward function may be simplified, thereby making the deep-Q learning faster and more efficient. Stated another way, the reward function may be simplified by incorporating prior knowledge directly into the learning process (e.g., training the network), as implemented by the traffic simulator 112 and the action generator 116. Because the Q-masker 114 masks actions based on prior knowledge, negative reward functions are not required, thereby simplifying the reward function. By using Q-masking, the Q-masker 114 may mitigate or eliminate collisions during training or testing, thereby making it possible to perform training directly on real systems, and not necessarily just those under simulation. Stated another way, the Q-masker 114 may enable implementation of training of autonomous vehicles on actual autonomous vehicles. Therefore, according to one aspect, the traffic simulator 112 may be instead replaced with a sensor that detects one or more other vehicles (e.g., a first vehicle, a second vehicle, a third vehicle, etc. and one or more associated attributes, such as a velocity, position, lane location, turn signals, etc.).

The action generator 116 may explore a remaining set of actions from the set of possible actions and determine the autonomous vehicle policy for the time interval based on the remaining set of actions (e.g., excluding the masked subset of actions) and the set of attributes associated with the autonomous vehicle. The action generator 116 may explore the remaining set of actions from the set of possible actions and determine the autonomous vehicle policy for one or more additional time intervals, such as until the autonomous vehicle reaches a terminal state (e.g., the goal or desired destination). Here, the action generator 116 may store one or more of the explored set of actions associated with the one or more additional time intervals as one or more corresponding trajectories. As previously discussed, a trajectory may be a sequence of states and/or actions which include those states.

The action generator 116 may explore the remaining set of actions from the set of possible actions based on the reward function and determine the autonomous vehicle policy based on the reward function. The reward function may include the discount factor. Through training and/or simulation, the action generator 116 may learn the autonomous vehicle policy, which may be stored to the storage drive 106, communicated to the vehicle 120, and implemented via the vehicle ECU 122 to facilitate autonomous driving.

During training, actions may be taken in an epsilon-greedy manner and E may be annealed. The action generator 116 may simulate full trajectories until the terminal state and classify the trajectories as either good or bad (i.e., the good buffer is associated with the simulated autonomous vehicle making it to the goal without being involved in collisions, exceeding the speed limit, etc.). Explained another way, all transitions (i.e., state, action, and reward tuples from successful trajectories) are saved in the good buffer while transitions from failed trajectories (i.e., not making it to the goal) are saved in the bad buffer.

For any transition, the expected reward may be back calculated from the terminal reward, given by the following:

$$y_t = \begin{cases} r_t & t = T; \text{terminal} \\ r_t + \gamma y_{t+1} & \text{otherwise} \end{cases},$$

where $\gamma$ is the discount factor.

The network may be optimized using the following loss function, using a mini batch of transitions equally sampled from the good and bad buffer:

$$\mathcal{L}(\theta) = (y_t - Q(s_t, a_t, \theta))^2$$

The two separate buffers help maintain a decent exposure to successful executions when the exploration might constantly lead to failed trajectories, thus avoiding the network getting stuck in a local minima.

In this way, the autonomous vehicle policy generation system 100 provides a framework that leverages the strengths of deep reinforcement learning for high-level tactical decision making and demonstrates a more structured and data efficient alternative to end-to-end complete policy learning on problems where a high-level policy may be difficult to formulate using traditional optimization or rule based methods, but where well-designed low-level controllers (e.g., the controller implementing the Q-masker 114) are available. The autonomous vehicle policy generation system 100 uses deep reinforcement learning to obtain a high-level policy for tactical decision making, while maintaining a tight integration with the low-level controller.

Applying this framework to autonomous lane changing decision making for self-driving vehicles (e.g., autonomous vehicles), the network may learn a high-level tactical decision making policy. Experimental results against a greedy baseline and human drivers have proven that the autonomous vehicle policy generation system 100 and method described herein are able to outperform both with more efficient and at a much lower collision rate (e.g., by eliminating collisions). The greedy baseline may be a policy where the autonomous vehicle prioritizes making a right lane change until it is in the correct lane, then travelling as fast as possible while staying within speed limits, and not colliding with other vehicles.

According to one aspect, the state input generator 108 may note occlusions and the traffic simulator 112 may provide a probabilistic occupancy grid. Further, the traffic simulator 112 may receive a history of the occupancy grid from previous time intervals, as separate channels.

Figure 2:
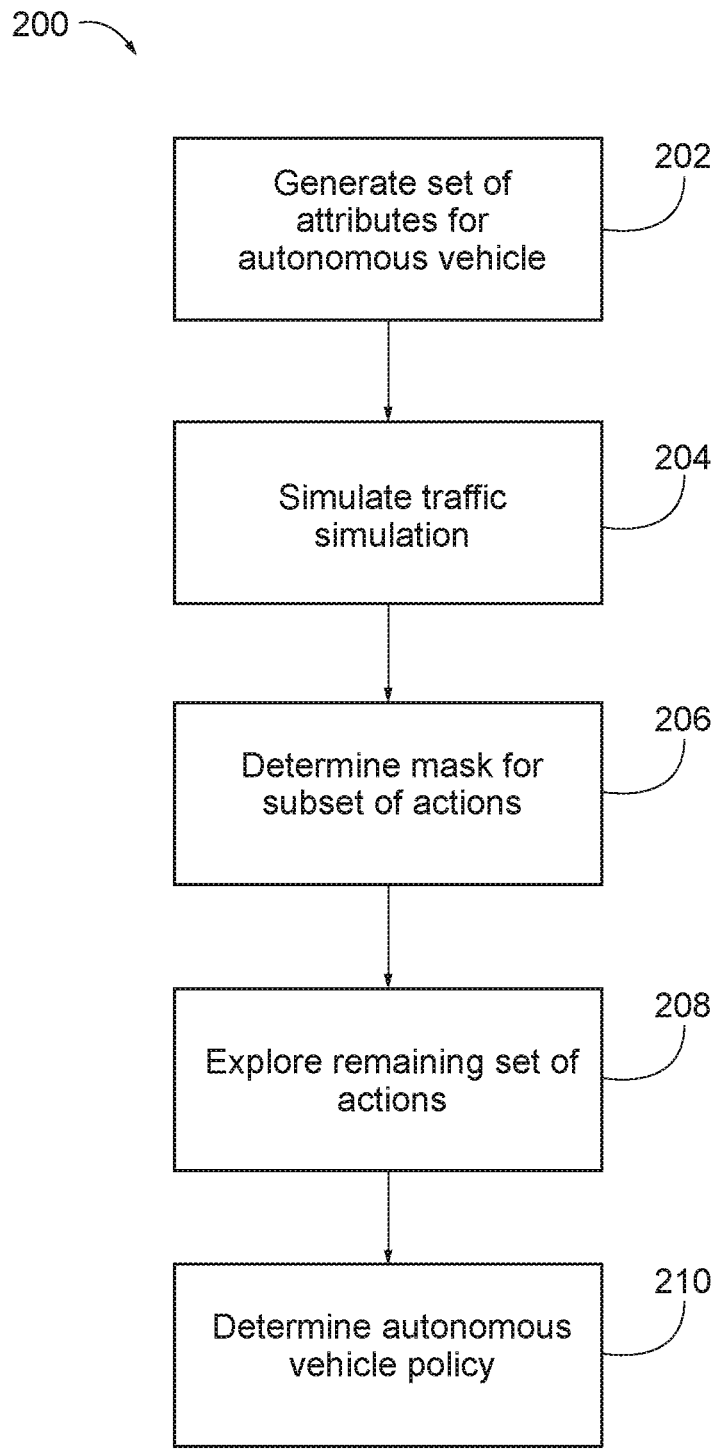
FIG. 2 is a flow diagram of an autonomous vehicle policy generation method, according to one or more aspects.

FIG. 2 is a flow diagram of an autonomous vehicle policy generation method 200, according to one or more aspects. At 202, a set of attributes for an autonomous vehicle is generated. The set of attributes may include a current velocity associated with the autonomous vehicle, a lane position associated with the autonomous vehicle, and a distance from the autonomous vehicle to a goal, wherein the goal is a desired destination. At 204, a traffic simulation is performed. For example, the simulation environment may include the autonomous vehicle, a roadway associated with a number of lanes, and another vehicle within the simulation environment.

At 206, a mask is determined for a subset of actions. The mask may be determined based on prior knowledge indicative of predefined permissible interactions between the autonomous vehicle and the simulation environment or between the autonomous vehicle and the other vehicle within the simulation environment, a traffic rule indicative of permissible driving maneuvers, or a capability associated with the autonomous vehicle indicative of physically possible driving maneuvers associated with the autonomous vehicle.

At 208, a remaining set of actions which are not masked is explored. Stated another way, the simulation may explore all possible outcomes associated with the remaining set of actions, sorting these into two classes: good and bad, where good is associated with the simulated autonomous vehicle reaching the goal, and bad is associated with the simulated autonomous vehicle not reaching the goal. At 210, an autonomous vehicle policy is determined, such as based on the reward function or discount factor, which accounts for time, future reward versus present reward, etc.

Figure 3A:
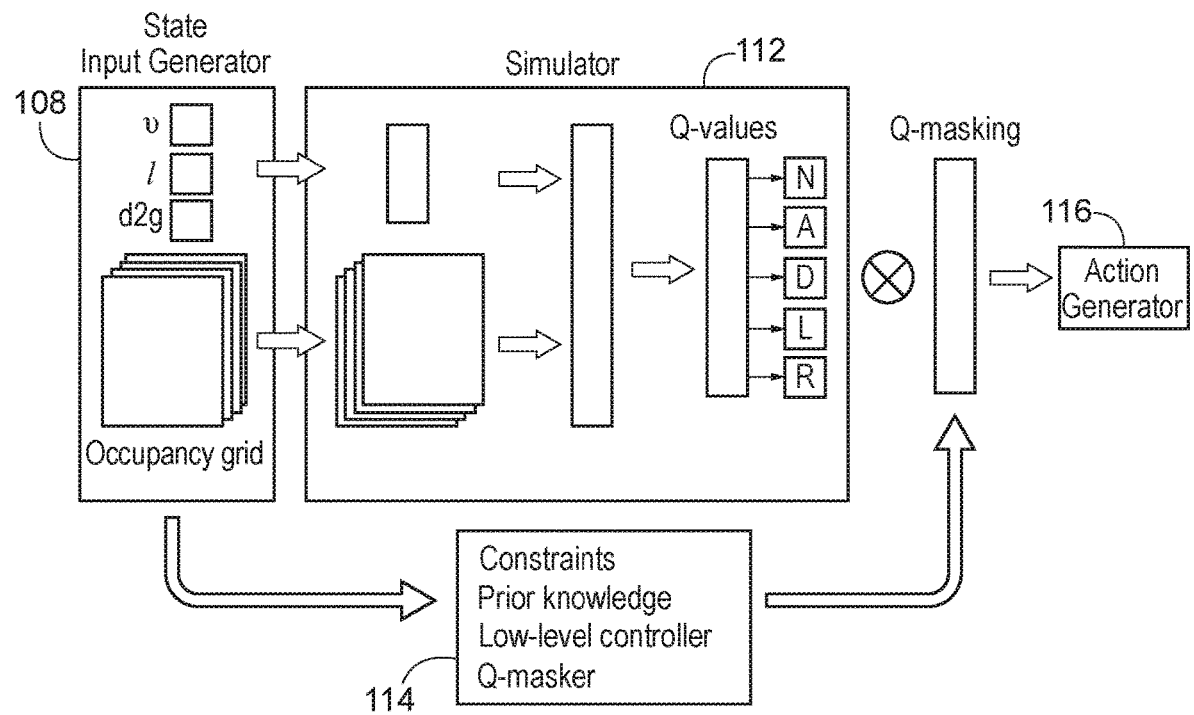
FIG. 3A is a flow diagram of an autonomous vehicle policy generation method, according to one or more aspects.

FIG. 3A is a flow diagram of an exemplary autonomous vehicle policy generation method, according to one or more aspects. The occupancy grid with history may be passed through a single convolution layer, flattened out, and concatenated with the output of a fully connected layer with the scalar inputs 108. The concatenation is passed through a fully connected layer to give the final output of 5 Q-values associated with the 5 tactical actions. As seen in FIG. 3A, Q-masking 114 is injected between the Q-values and the max operation to determine the action 116, thereby incorporating prior information so learning from scratch through exploration does not need to occur. The max operation may be a max or soft-max operation on the Q-values to select an action.

Figure 3B:
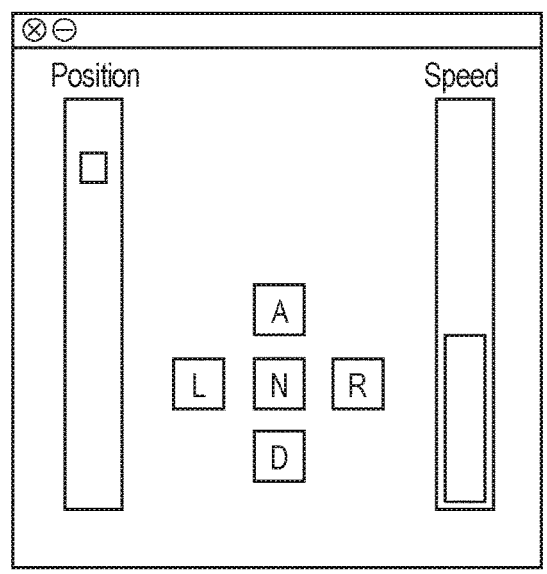
FIG. 3B is an exemplary simulation interface associated with autonomous vehicle policy generation, according to one or more aspects.

FIG. 3B is an exemplary simulation interface associated with autonomous vehicle policy generation, according to one or more aspects. As previously discussed, the set of possible actions for the autonomous vehicle includes an autonomous driving maneuver of, during a time interval, maintaining the current velocity associated with the autonomous vehicle (e.g., 'N' or no operation), accelerating (A), decelerating (D), performing a right lane change (R), or performing a left lane change (L).

Figure 4A:
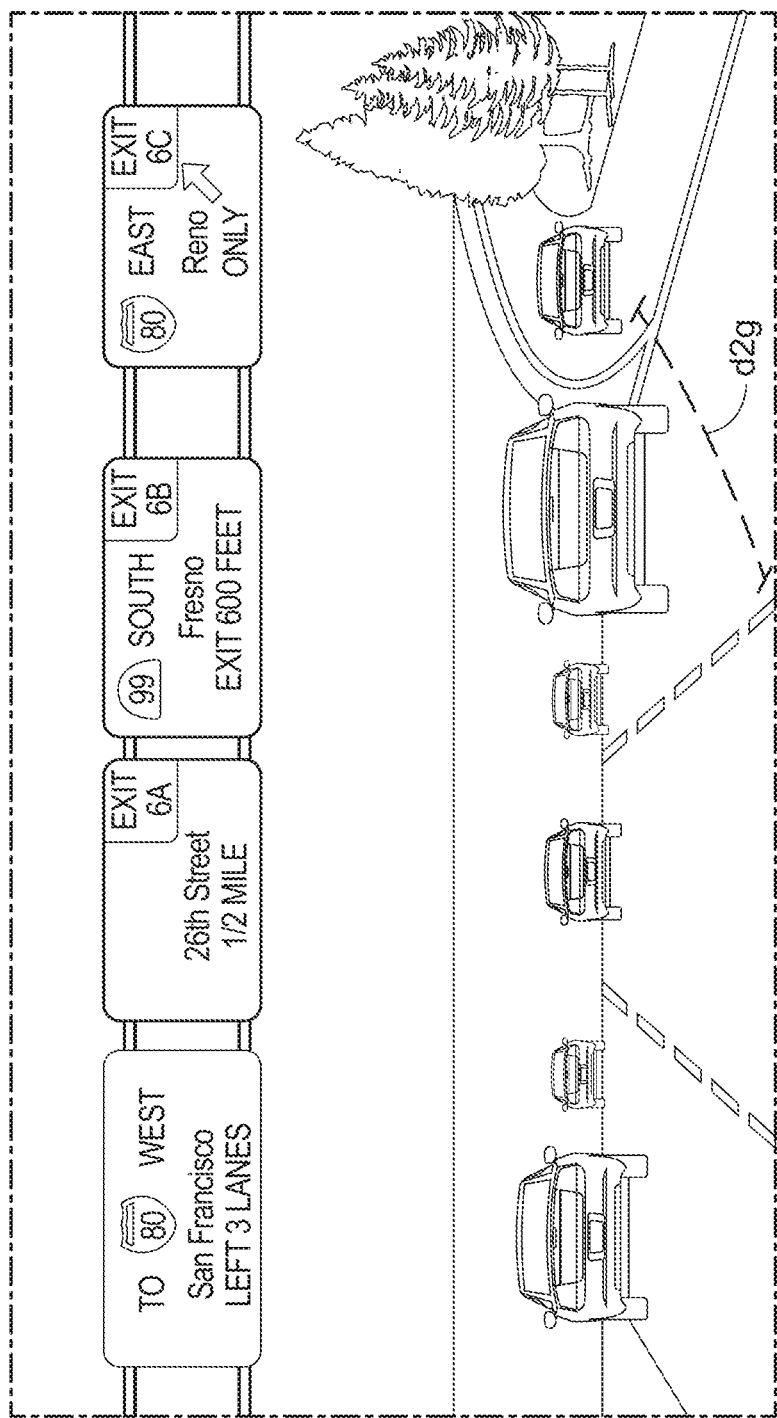
FIGS. 4A-4C are exemplary scenarios where autonomous vehicle policy generation may be implemented, according to one or more aspects.
Figure 4C:
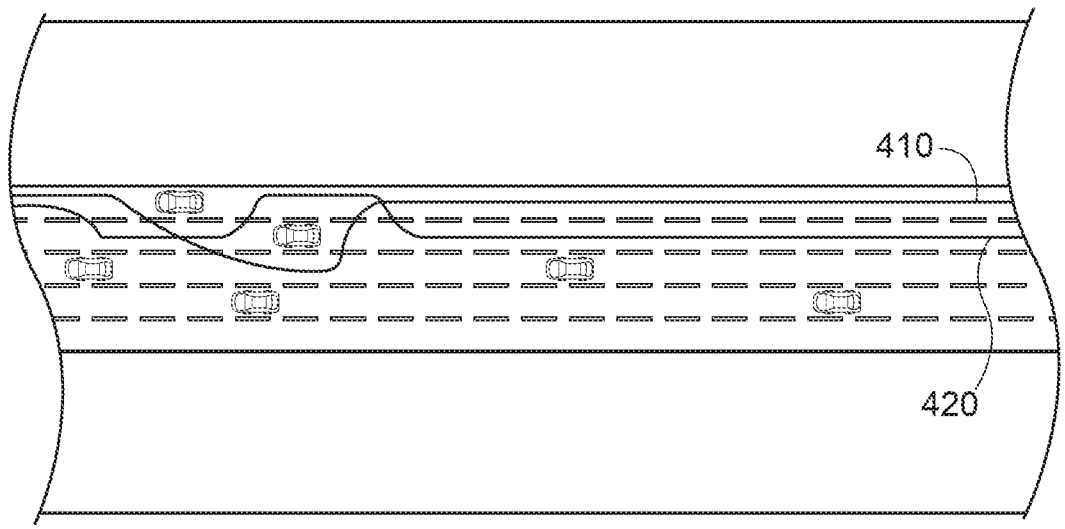
Figure 4B:
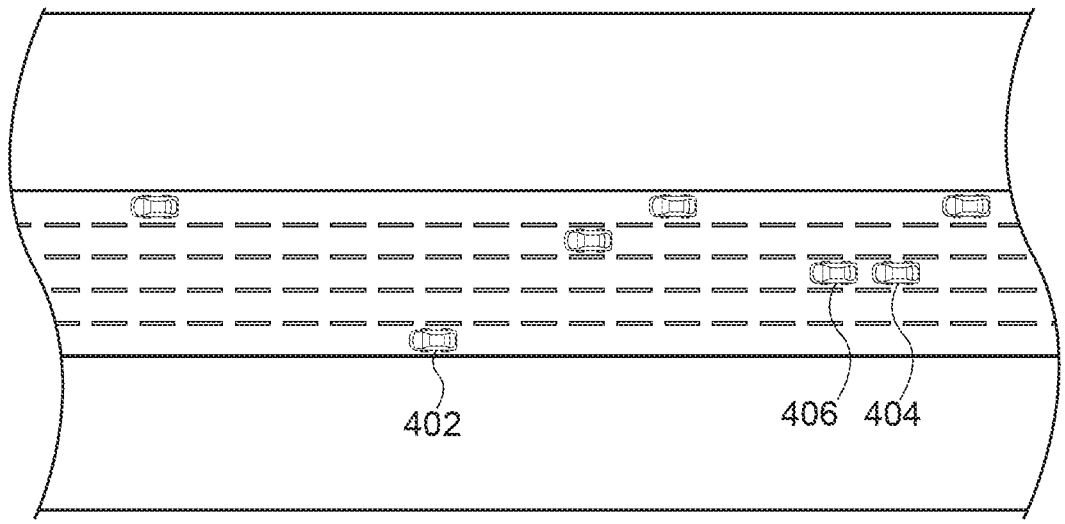

FIGS. 4A-4C are exemplary scenarios where autonomous vehicle policy generation may be implemented, according to one or more aspects. According to one exemplary aspect, the simulated autonomous vehicle is tasked with reaching an exit at the right most lane in a minimum amount of time, as seen in FIG. 4A, while respecting speed limits and avoiding collisions, etc. In FIG. 4A, the autonomous vehicle is a distance to goal d2g from the exit. If the simulated autonomous vehicle fails to reach the exit (e.g., the goal in this scenario), this is considered a failure by the action generator 116 or the traffic simulator 112. Because the distance to goal is being considered along with information, such as the prior knowledge of constraint information from the low-level controller, both high-level and low-level considerations are being taken into account.

In FIG. 4B, if the autonomous vehicle or agent is at position 402, the left lane change action may be masked by the Q-masker 114 because the autonomous vehicle is already in the left-most lane of the roadway. Similarly, the acceleration action may be masked by the Q-masker 114 when the autonomous vehicle is at position 404, while the deceleration action may be masked by the Q-masker 114 when the autonomous vehicle is at position 406. These acceleration and deceleration actions may be masked based on threshold distances to other vehicles, respectively.

In FIG. 4C, two different trajectories 410 and 420 are shown. The action generator may select the trajectory associated with a higher reward (e.g., faster time) because the Q-masker 114 has already mitigated the majority of risk in any decision making involved with the respective trajectories.

Figure 5:
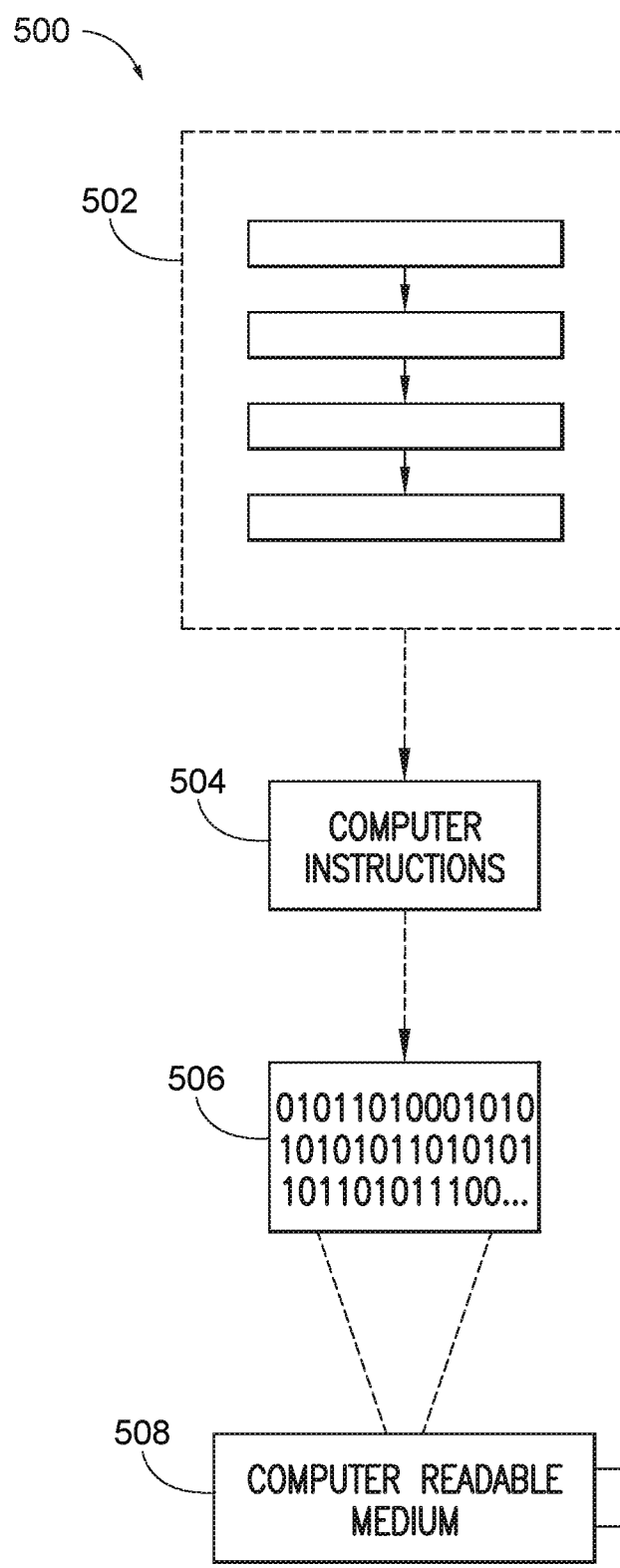
FIG. 5 is an illustration of an example computer-readable medium or computer-readable device including processor-executable instructions configured to embody one or more of the provisions set forth herein, according to one or more aspects.

Still another aspect involves a computer-readable medium including processor-executable instructions configured to implement one or more aspects of the techniques presented herein. An aspect of a computer-readable medium or a computer-readable device devised in these ways is illustrated in FIG. 5, wherein an implementation 500 includes a computer-readable medium 508, such as a CD-R, DVD-R, flash drive, a platter of a hard disk drive, etc., on which is encoded computer-readable data 506. This computer-readable data 506, such as binary data including a plurality of zero's and one's as shown in the computer-readable data 506, in turn includes a set of processor-executable computer instructions 504 configured to operate according to one or more of the principles set forth herein. In one such aspect 500, the processor-executable computer instructions 504 may be configured to perform a method 502, such as the method 200 of FIG. 2. In another aspect, the processor-executable computer instructions 504 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a microprocessor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 6:
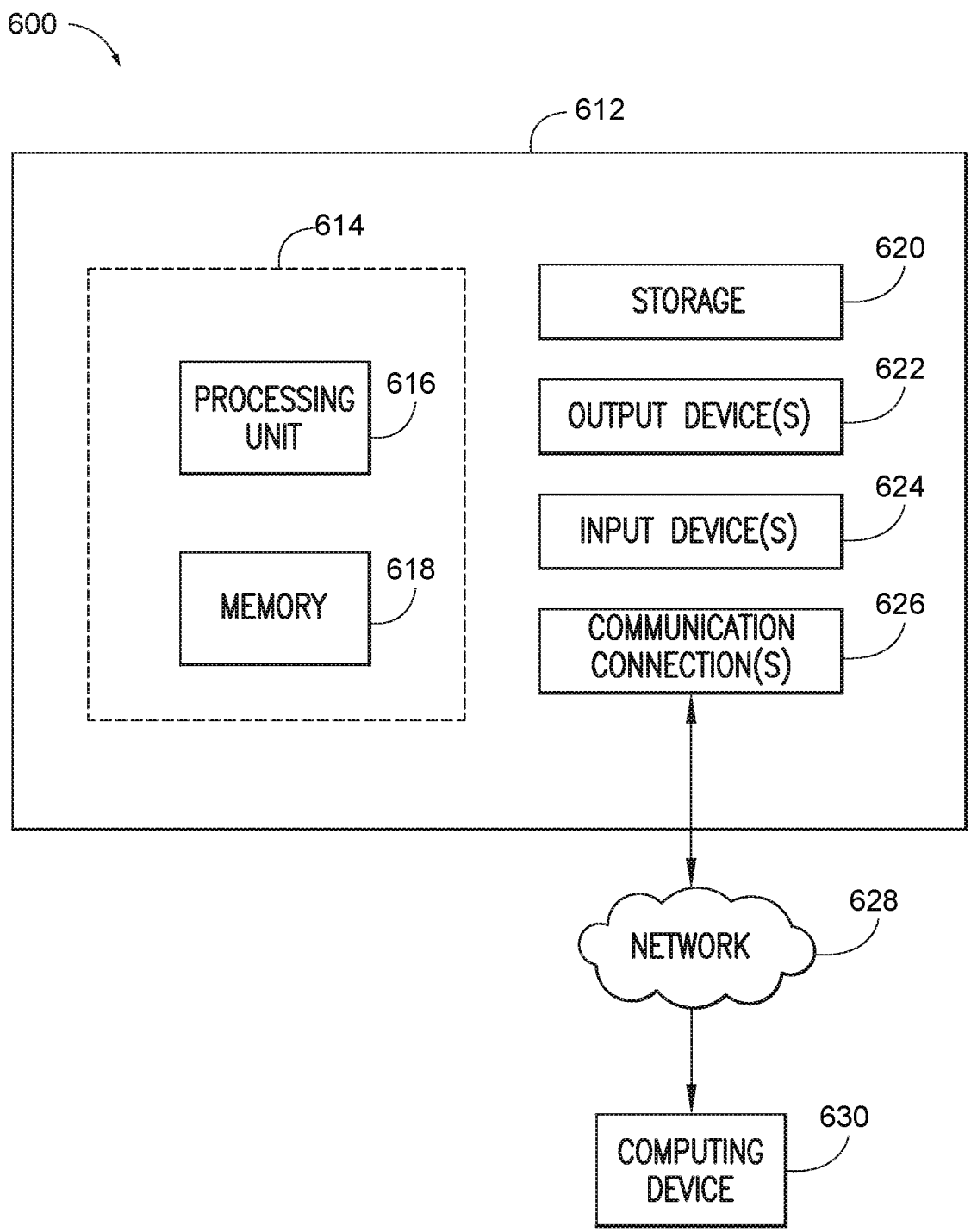
FIG. 6 is an illustration of an example computing environment where one or more of the provisions set forth herein are implemented, according to one or more aspects.

FIG. 6 and the following discussion provide a description of a suitable computing environment to implement aspects of one or more of the provisions set forth herein. The operating environment of FIG. 6 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 6 illustrates a system 600 including a computing device 612 configured to implement one or more aspects provided herein. In one configuration, computing device 612 includes at least one processing unit 616 and memory 618. Depending on the exact configuration and type of computing device, memory 618 may be volatile, such as RAM, non-volatile, such as ROM, flash memory, etc., or a combination of the two. This configuration is illustrated in FIG. 6 by dashed line 614.

In other aspects, the computing device 612 includes additional features or functionality. For example, the computing device 612 may include additional storage such as removable storage or non-removable storage, including, but not limited to, magnetic storage, optical storage, etc. Such additional storage is illustrated in FIG. 6 by storage 620. In one or more aspects, computer readable instructions to implement one or more aspects provided herein are in storage 620. Storage 620 may store other computer readable instructions to implement an operating system, an application program, etc. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 612. Any such computer storage media is part of the computing device 612.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 612 includes input device(s) 624 such as keyboard, mouse, pen, voice input device, touch input device, infrared cameras, video input devices, or any other input device. Output device(s) 622 such as one or more displays, speakers, printers, or any other output device may be included with the computing device 612. Input device(s) 624 and output device(s) 622 may be connected to the computing device 612 via a wired connection, wireless connection, or any combination thereof. In one or more aspects, an input device or an output device from another computing device may be used as input device(s) 624 or output device(s) 622 for the computing device 612. The computing device 612 may include communication connection(s) 626 to facilitate communications with one or more other devices 630, such as through network 628, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An autonomous vehicle policy generation system, comprising:
    a state input generator generating a set of attributes associated with an autonomous vehicle undergoing training;
    a traffic simulator simulating a simulation environment including the autonomous vehicle, a roadway associated with a number of lanes, and another vehicle within the simulation environment;
    a Q-masker determining a mask to be applied to a subset of a set of possible actions for the autonomous vehicle for a time interval; and
    an action generator exploring a remaining set of actions from the set of possible actions and determining an autonomous vehicle policy for the time interval based on the remaining set of actions and the set of attributes associated with the autonomous vehicle,
    wherein the remaining set of actions excludes the masked subset of actions.

2. The autonomous vehicle policy generation system of claim 1, wherein the set of attributes includes a current velocity associated with the autonomous vehicle, a lane position associated with the autonomous vehicle, and a distance from the autonomous vehicle to a goal, wherein the goal is a desired destination.

3. The autonomous vehicle policy generation system of claim 1, wherein the set of possible actions for the autonomous vehicle includes an autonomous driving maneuver of, during the time interval, maintaining a current velocity associated with the autonomous vehicle, accelerating, decelerating, performing a right lane change, or performing a left lane change.

4. The autonomous vehicle policy generation system of claim 1, wherein the Q-masker determines the mask to be applied to the subset of actions based on prior knowledge indicative of predefined permissible interactions between the autonomous vehicle and the simulation environment or between the autonomous vehicle and the other vehicle within the simulation environment, a traffic rule indicative of permissible driving maneuvers, or a capability associated with the autonomous vehicle indicative of physically possible driving maneuvers associated with the autonomous vehicle.

5. The autonomous vehicle policy generation system of claim 4, wherein the Q-masker determines, based on the prior knowledge, the masked subset of actions to include:
an autonomous driving maneuver of performing a right lane change when the autonomous vehicle is positioned on a right-most lane of the roadway; and
an autonomous driving maneuver of performing a left lane change when the autonomous vehicle is positioned on a left-most lane of the roadway.

6. The autonomous vehicle policy generation system of claim 4, wherein the Q-masker determines, based on the prior knowledge, the masked subset of actions to include:
an autonomous driving maneuver of accelerating when the autonomous vehicle is positioned a first threshold distance behind the other vehicle when both the autonomous vehicle and the other vehicle are positioned in the same lane; and
an autonomous driving maneuver of decelerating when the autonomous vehicle is positioned a second threshold distance ahead of the other vehicle when both the autonomous vehicle and the other vehicle are positioned in the same lane.

7. The autonomous vehicle policy generation system of claim 4, wherein the Q-masker determines, based on the prior knowledge, the masked subset of actions to include:
an autonomous driving maneuver of a left lane change when the autonomous vehicle is positioned to the right and within a lane change threshold distance of the other vehicle; and
an autonomous driving maneuver of a right lane change when the autonomous vehicle is positioned to the left and within the lane change threshold distance of the other vehicle.

8. The autonomous vehicle policy generation system of claim 4, wherein the Q-masker determines, based on the prior knowledge, the masked subset of actions to include any driving maneuver associated with an anticipated decrease with a time to collision (TTC) estimate between the autonomous vehicle and the other vehicle when the TTC estimate is below a threshold TTC value.

9. The autonomous vehicle policy generation system of claim 4, wherein the Q-masker determines, based on the traffic rule, the masked subset of actions to include:
accelerating when a current velocity associated with the autonomous vehicle is greater than a speed limit associated with the roadway; and
decelerating when the current velocity associated with the autonomous vehicle is less than a minimum speed limit associated with the roadway.

10. The autonomous vehicle policy generation system of claim 4, wherein the Q-masker determines, based on the traffic rule, the masked subset of actions to include:
an autonomous driving maneuver of performing a right lane change when the autonomous vehicle is positioned directly right of double lane markings of the roadway; and
an autonomous driving maneuver of performing a left lane change when the autonomous vehicle is positioned directly left of double lane markings of the roadway.

11. The autonomous vehicle policy generation system of claim 1, wherein the action generator explores the remaining set of actions from the set of possible actions and determines the autonomous vehicle policy for one or more additional time intervals until the autonomous vehicle reaches a terminal state.

12. The autonomous vehicle policy generation system of claim 11, wherein the action generator stores one or more explored set of actions associated with the one or more additional time intervals as one or more corresponding trajectories.

13. The autonomous vehicle policy generation system of claim 1, wherein the action generator explores the remaining set of actions from the set of possible actions based on a reward function and determines the autonomous vehicle policy based on the reward function.

14. The autonomous vehicle policy generation system of claim 13, wherein the reward function includes a discount factor.

15. An autonomous vehicle policy generation method, comprising:
generating a set of attributes associated with an autonomous vehicle undergoing training;
simulating a simulation environment including the autonomous vehicle, a roadway associated with a number of lanes, and another vehicle within the simulation environment;
determining a mask to be applied to a subset of a set of possible actions for the autonomous vehicle for a time interval;
exploring a remaining set of actions from the set of possible actions; and
determining an autonomous vehicle policy for the time interval based on the remaining set of actions and the set of attributes associated with the autonomous vehicle,
wherein the remaining set of actions excludes the masked subset of actions.

16. The autonomous vehicle policy generation method of claim 15, wherein the set of attributes includes a current velocity associated with the autonomous vehicle, a lane position associated with the autonomous vehicle, and a distance from the autonomous vehicle to a goal, wherein the goal is a desired destination.

17. The autonomous vehicle policy generation method of claim 15, wherein the set of possible actions for the autonomous vehicle includes an autonomous driving maneuver of, during the time interval, maintaining a current velocity associated with the autonomous vehicle, accelerating, decelerating, performing a right lane change, or performing a left lane change.

18. The autonomous vehicle policy generation method of claim 15, wherein determining the mask to be applied to the subset of actions is based on prior knowledge indicative of predefined permissible interactions between the autonomous vehicle and the simulation environment or between the autonomous vehicle and the other vehicle within the simulation environment, a traffic rule indicative of permissible driving maneuvers, or a capability associated with the autonomous vehicle indicative of physically possible driving maneuvers associated with the autonomous vehicle.

19. The autonomous vehicle policy generation method of claim 15, comprising implementing the autonomous vehicle policy for an autonomous vehicle outside the simulation environment.

20. An autonomous vehicle policy generation system, comprising:
  a state input generator generating a set of attributes associated with an autonomous vehicle undergoing training;
  a traffic simulator simulating a simulation environment including the autonomous vehicle, a roadway associated with a number of lanes, and another vehicle within the simulation environment;
  a Q-masker determining a mask to be applied to a subset of a set of possible actions for the autonomous vehicle for a time interval based on prior knowledge indicative of predefined permissible interactions between the autonomous vehicle and the simulation environment or between the autonomous vehicle and the other vehicle within the simulation environment, a traffic rule indicative of permissible driving maneuvers, or a capability associated with the autonomous vehicle indicative of physically possible driving maneuvers associated with the autonomous vehicle; and
  an action generator exploring a remaining set of actions from the set of possible actions and determining an autonomous vehicle policy for the time interval based on the remaining set of actions and the set of attributes associated with the autonomous vehicle,
  wherein the remaining set of actions excludes the masked subset of actions.

* * * * *